T. J. NEACY.
GANG EDGER.

No. 282,213. Patented July 31, 1883.

Witnesses.

Inventor.
Thomas J. Neacy
by
Attorney

T. J. NEACY.
GANG EDGER.
No. 282,213. Patented July 31, 1883.
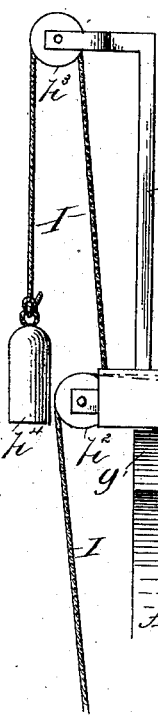
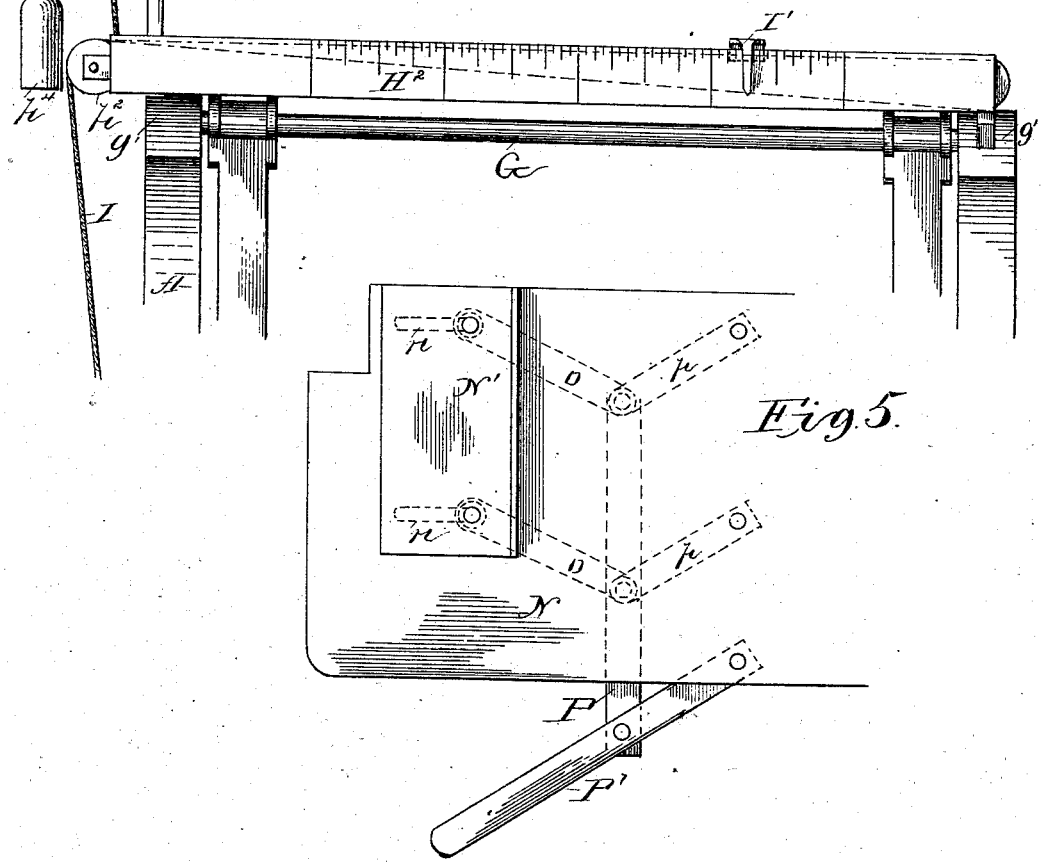
Fig. 4.
Fig. 5.

UNITED STATES PATENT OFFICE.

THOMAS J. NEACY, OF MILWAUKEE, WISCONSIN.

GANG-EDGER.

SPECIFICATION forming part of Letters Patent No. 282,213, dated July 31, 1883.

Application filed February 17, 1880.

*To all whom it may concern:*

Be it known that I, THOMAS J. NEACY, of Milwaukee, in the county of Milwaukee and State of Wisconsin, have invented certain new and useful Improvements in Gang-Edgers; and I do hereby declare that the following is a full, clear, and exact description thereof.

My invention relates to that class of saw-mill machinery known as "gang-edgers;" and it consists in the device hereinafter described.

Figure 1:
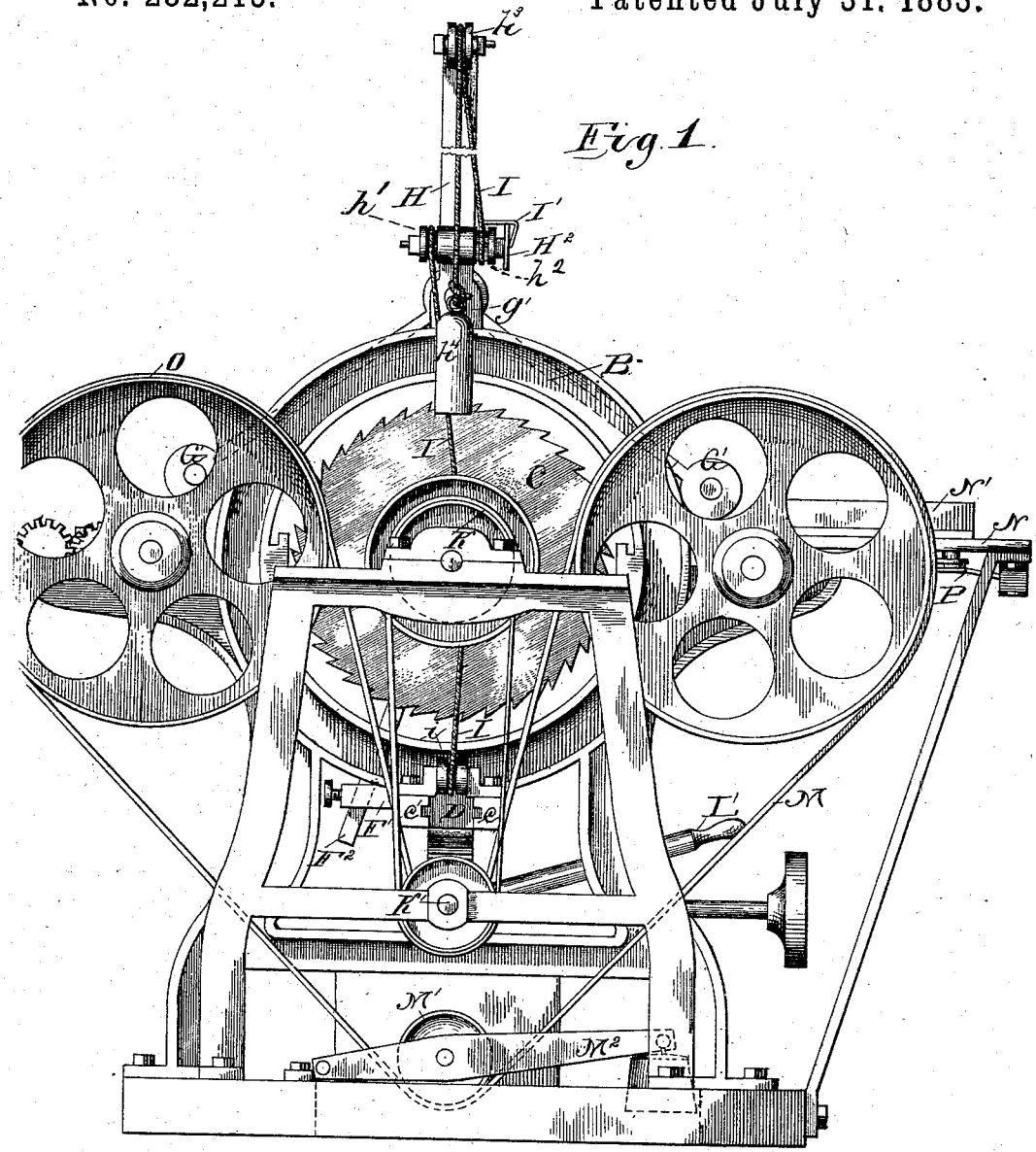
Figure 2:
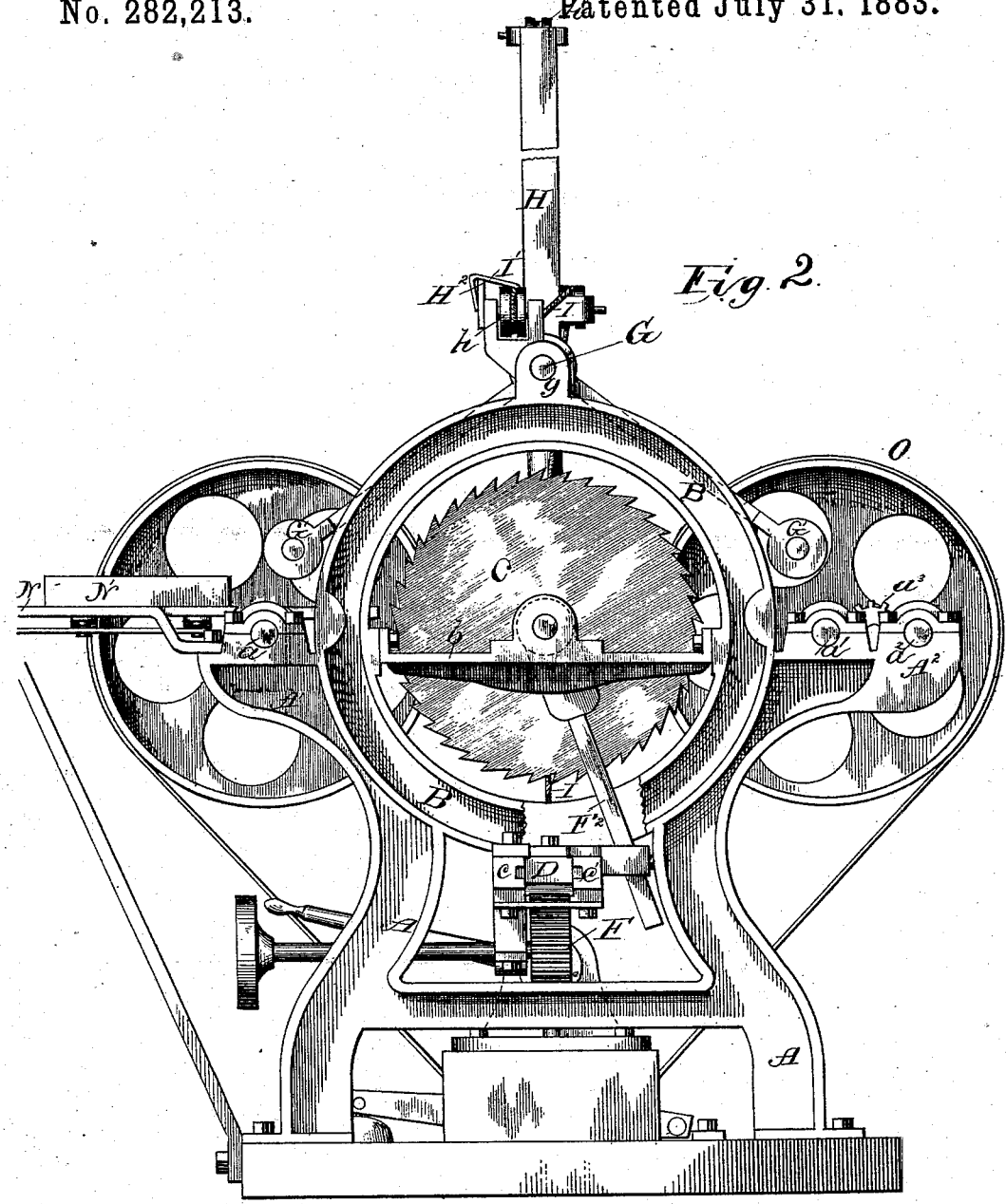
Figure 3:
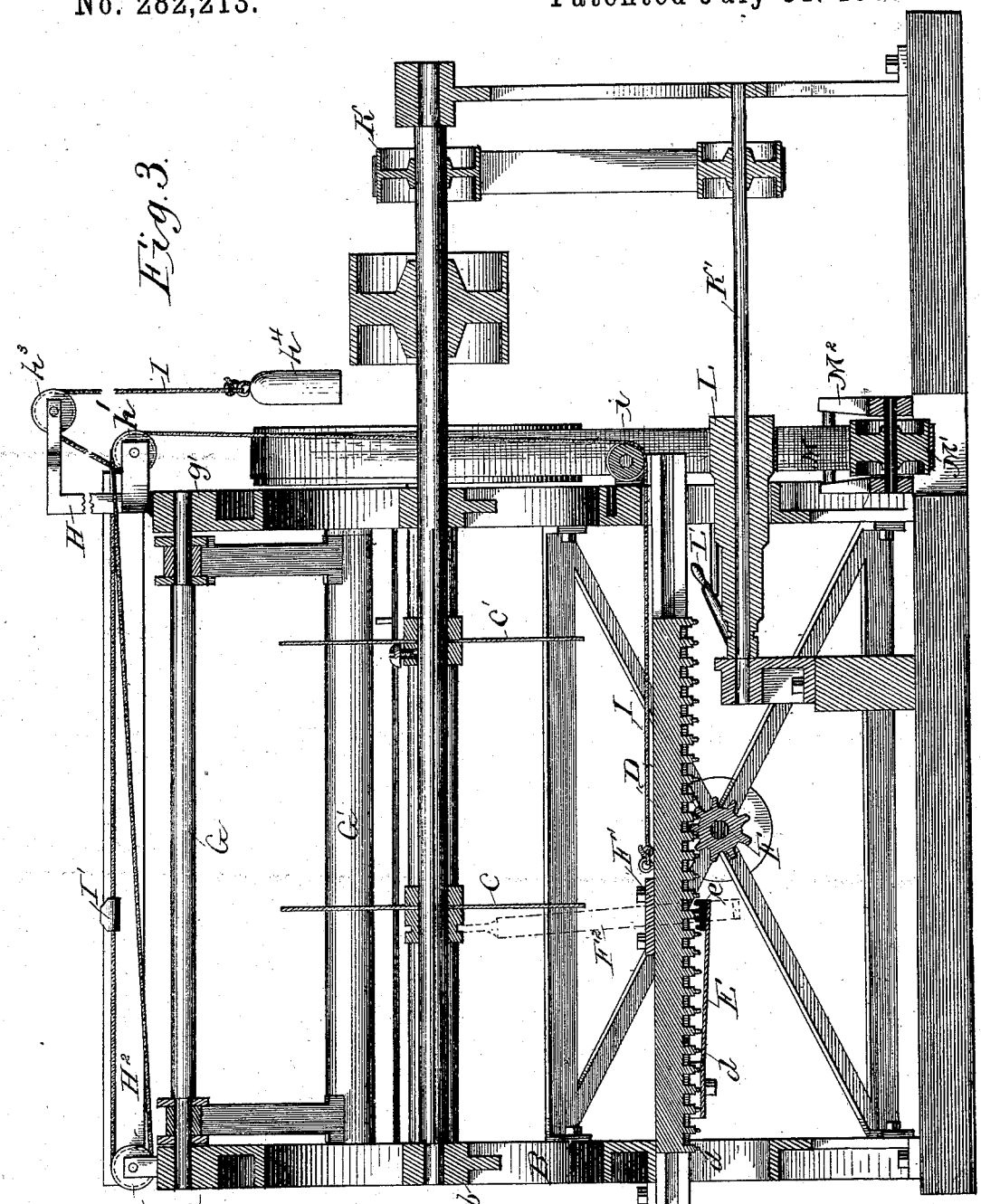

In the drawings, Figure 1 is an end view of my machine; Fig. 2, a view of the opposite end; Fig. 3, a longitudinal central section; Fig. 4, a detached view of the scale-bar and index, and Fig. 5 a detached view of a portion of the table.

A is the frame of my machine, which has arms A' A² at each end, in which are bearings for feed-rollers $a$ $a'$ $a^2$, Fig. 2, and between these arms are circles B B, which carry the bearing-bars $b$ $b$ of the saw-arbor, and the bracket $c$ $c'$, in which the setting-bar D plays. This bar D has the ordinary bevel-teeth, except that they are pointed by small supplemental teeth $d$ $d$, for engagement with the rack or notches $e$ on the holding-spring E; or instead of a spring I may use a weighted bar or lever. The setting-bar is reciprocated by a cog-wheel, F, and has a lug, F', attached to its upper side and projecting to the rear of the bar $c'$, to support and carry a bracket-arm, F², which passes through it and is held in adjustment by a binding-screw. The upper end of the arm F² is forked and fits over a collar on the hub of saw C, grooved to receive it. By these means the saw C is moved upon its shaft. On top of the circles B B are provided lugs $g$ $g'$, in which is fastened the rod G, that carries the arms of the presser-rolls G', and to which lugs are attached the scaled bar H², and also these afford bearings for the pulleys $h$ $h'$ $h^2$. A fourth pulley, $h^3$, is carried by a standard, H, extending up from lugs $g'$.

Attached to the setting-bar, near the lug F', is a cord, I, which passes under a pulley, $i$, up over a pulley, $h'$, back under and over $h$, where it is provided with an index, I', thence under pulley $h^2$ and over pulley $h^3$, and is then provided with a weight or spring for keeping it drawn tight, so that any movement of the saw will be indicated by the index I'.

Just beneath the driving-pulley K, I arrange a shaft, K', communicating with it by a suitable belt, and on this shaft I arrange a laterally-adjustable stepped pulley, L, which communicates motion to the large pulleys, that in turn drive the feed-rollers. A forked lever, L', or any other suitable device, may be employed to shift this pulley, the office of which is to regulate the speed of the feed-rollers. The belt M is tightened by a pulley, M', which has bearings in a hinged and weighted arm, M². The feed-rollers $a'$ $a^2$ are connected by a pinion, $a^3$, and are turned simultaneously by the pulley O.

N is the table of my machine, to which I attach a guide, N', by bolts passing down through slots $n$ in the table, and pivoting it to bars $o$ $o$, which in turn are pivoted to a central bar, P, from which other bars, $p$ $p$, extend, and are pivoted beyond it to the under side of the table. By this means the guide may be adjusted on a line parallel to the cut of the saw C to determine the amount of edge to be taken off.

What I claim is—

1. In an edging-machine, the combination of the feed-rollers driven by a belt common to all, a tightening-pulley, and an intermediate sliding stepped pulley which receives its motion from the power-shaft and communicates it to the belt which drives the feed-rollers, substantially as and for the purpose specified.

2. The combination, with the saw adjustable upon its shaft, of a rack provided with an arm or lever for controlling the saw, a pinion for operating the rack, and the spring-ratchet for holding the rack, substantially as specified.

3. The setting-bar D, the cord I, which is attached thereto and also to the index I', index I', and scale-bar H², along which the index travels, and a weight secured to the end of the cord I, which serves to keep the cord I taut, substantially as and for the purposes set forth.

4. The setting-bar D, the cord I, which is attached thereto and also to the index I', a weight attached to cord I, index I', scale-bar H², along which index I' travels, and movable saw C, connected by suitable means to the setting-bar, substantially as and for the purposes set forth.

In testimony that I claim the foregoing I have hereunto set my hand.

THOMAS J. NEACY.

Witnesses:
 E. H. BOTTUM,
 S. S. STOUT.